United States Patent Office 3,804,771
Patented Apr. 16, 1974

3,804,771
THERMOGENIC SYSTEMS
Elly T. Margolis, Los Angeles, Calif., assignor to Dart Industries, Inc., Los Angeles, Calif.
No Drawing. Filed Sept. 13, 1972, Ser. No. 288,861
Int. Cl. C09k 3/00
U.S. Cl. 252—188.3                12 Claims

ABSTRACT OF THE DISCLOSURE

A system based on exothermic chemical reactions for heating consumer products as dispensed from pressurized containers. The system includes chemical compositions comprising certain sulfur-containing compounds, and combinations of certain sulfur-and-nitrogen containing compounds with formaldehyde, which react with appropriate oxidizing agents to form, among other reaction products, carbon dioxide or carbonate ion, and sulfate ion.

BACKGROUND OF THE INVENTION

Field of the invention

The present invention relates to thermogenic systems and, more particularly, to means for generating heat in compositions dispensed from container packages.

Description of the prior art

Considerable efforts have been expended on developing means to dispense warmed compositions for shaving, shampooing, cleaning, disinfecting and other purposes. Among the more recent self-heating systems is that described in Moses et al., U.S. Pat. 3,341,418, wherein a redox reaction between hydrogen peroxide and thiourea or various thiobarbituric acid derivatives is disclosed. A disadvantage of this process, however, is that for every mole of thiourea reacted, one mole of sulfuric acid is formed, necessitating the presence of excess alkali to prevent the destruction of soap in a soap-containing composition. The thiobarbituric acid derivatives disclosed are generally not readily available and are expensive.

Another redox heating system is found in Antonelli et al., U.S. Pat. 3,632,516, which employs as a reductant, potassium thiosulfate or a mixture of potassium thiosulfate and potassium sulfite with a sodium tungstate catalyst. While oxidation of thiosulfate ion provides a greater heat yield than does the oxidation of thiourea, the problem with this system is the fact that for every mole of thiosulfate oxidized, two moles of sulfate ion are generated requiring the presence of excess base to prevent the pH from dropping precipitously and inhibiting the formation of a soap. The thiosulfate and sulfite salts tend to cause gelling of soap compositions and are also highly corrosive to metal dispensing containers and to the valve means commonly utilized with such.

SUMMARY OF THE INVENTION

It has now been found that mixtures containing certain xanthates, or dithiocarbamates, or a combination of formaldehyde and molecular entities incorporating the grouping

may be utilized as safe, economical, and highly effective means of obtaining a sensible heat rise in ready-to-use consumer items. Exemplary of materials having the grouping

are thiourea, acyl thioureas, thioamides, dithiocarbamates of primary amines and amides, imidazolidinethiones, thiazolidinethiones, thioglycolurils, and thiobarbiturates.

When the above xanthates, dithiocarbamates or the combination of formaldehyde and materials having the

grouping are mixed with an oxidant such as hydrogen peroxide, sufficient thermal energy is produced to raise the temperature of the entire mixture, including whatever cosmetic, deicing, degreasing, disinfecting or other consumer-type compositions that are present. A high heating efficiency is obtained with low-cost materials with reduced potential for corrosive action on the container and associated dispensing apparatus.

DESCRIPTION OF THE INVENTION

It has been found that certain compounds within the classes of chemical compounds known as dithiocarbamates and xanthates react vigorously with hydrogen peroxide in alkaline solution with or without the use of the usual hydrogen peroxide—activating catalysts to generate heat. As will be described below, it has also been found that even higher temperatures are attained on about an equi-molar basis when compounds having the grouping

are combined with formaldehyde in preparing the composition to be mixed with hydrogen peroxide.

A number of xanthates and dithiocarbamates are available commercially, but for the purposes of this invention, it is often more economical and convenient to formulate them during the process of preparing the package in which they are to be used. That is, the precursors for forming the xanthates and dithiocarbamates of the present invention may be commercially available whereas the particular xanthate or dithiocarbamate may not. In such a case, it is convenient to obtain the appropriate precursors and react them to form the desired thermogen and then use this in charging the dispensing package without going through the process and expense of isolating them.

Exemplary of xanthates and their preparation in the present invention are the following:

$$ROH + CS_2 + AOH \rightarrow ROC(S)SA + H_2O$$

where R is an alkyl containing 1–18 carbon atoms; or a hydroxyalkyl containing 1–18 carbon atoms; or an alkoxyalkyl exemplified by $R_1(OCHR_2CH_2)_n$ in which $R_1$ is the same as R, $R_2$ is H or an alkyl containing 1–4 carbon atoms and $n$ is a number from 1 to 20; or a tertiary aminoalkyl exemplified by $(R_4)_2NR_5$ where $R_4$ is an alkyl containing 1–18 carbon atoms or a hydroxyalkyl containing 2–4 carbon atoms and $R_5$ is an alkyl containing 2–18 carbon atoms and A is selected from the group consisting of Na, K, and a tertiary ammonium of which the formula is $(R_4)_3NH+$; or an alkyl phenyl in which the alkyl side chain contains 8 or 9 carbon atoms.

Exemplary of dithiocarbamates and their preparation in the present invention are the following:

(a) $RC(X)NHR_1 + CS_2 + AOH \rightarrow$
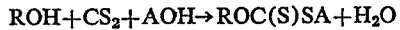
$RC(X)N(R_1)C(S)SA + H_2O$ where X is oxygen or sulfur; R is an alkyl containing 1–17 carbon atoms; $R_1$ is H or an alkyl containing 1–3 carbon atoms or hydroxyalkyl containing 2–4 carbons; and A is selected from the group consisting of Na, K, and a tertiary ammonium of which the formula is $(R_2)_3NH+$ where $R_2$ is an alkyl containing 1–18 carbon atoms or a hydroxyalkyl containing 2–4 carbon atoms.

(b)
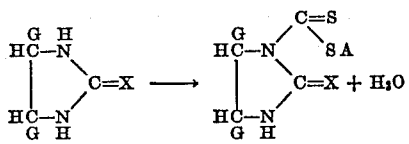

where A and X are as described under (a) above and G is hydrogen or a hydroxyl group.

(c) $RNHR_1 + CS_2 + BOH \rightarrow RN(R_1)C(S)SB + H_2O$ where R is an alkyl containing 1–18 carbon atoms; or a hydroxyalkyl containing 2–4 carbon atoms; or a tertiary aminoalkyl exemplified by $(R_2)_2NR_3$ where $R_2$ is a hydroxyalkyl containing 2–4 carbon atoms or an alkyl containing 2–18 carbon atoms and $R_3$ is an alkyl containing 2–18 carbon atoms; and, where $R_1$ is H, or an alkyl containing 1–18 carbon atoms, or a hydroxyalkyl containing 2–4 carbon atoms; and, where B is selected from the group consisting of Na, K, a tertiary ammonium of which the formula is $(R)_3NH+$.

(d) $2RNHR_1 + CS_2 \rightarrow RN(R_1)C(S)SNH_2RR_1$ where R is an alkyl containing 1–18 carbon atoms or a hydroxyalkyl containing 2–4 carbon atoms;

$R_1$ is H or an alkyl containing 1–18 carbon atoms or a hydroxyalkyl containing 2–4 carbon atoms.

The use of formaldehyde in conjunction with compositions having the grouping

as a self-heating system provides further unexpected advantages. The previously known chemistry of combining formaldehyde with hydrogen peroxide in an excess of alkali is for use an an analytical method to determine formaldehyde concentrations. The reaction produces hydrogen and formic acid salts in accordance with the following equation:

$HC(O)H + H_2O_2 + MOH \rightarrow HC(O)OM + H_2 + 2H_2O$ where M is an alkali metal.

In tests performed with the formaldehyde systems of the present invention, there is no evidence of the formation of either hydrogen or formic acid salts. Although the exact reaction mechanisms occurring are not completely known, the following explanation is given to enable one skilled in the art to better understand the invention without being bound thereby.

It is known that, in the case of thiourea, a mixture of one mole, or less, of formaldehyde with one mole of thiourea in water solution is in equilibrium with monomethylolthiourea as follows:

$H_2NC(S)NH_2 + HC(O)H \rightarrow H_2NC(S)N(H)CH_2OH$

It is also known that in alkaline solution, thiourea is in equilibrium with isothiourea:

$$H_2NC(S)NH_2 \xrightleftharpoons{OH-} H_2NC(NH)SH$$

It is therefore reasoned that the class of compounds found to react with hydrogen peroxide in the presence of formaldehyde, all of which contain the chemical grouping

behave similarly. It is further reasoned that it is the products of the reaction between

compounds with formaldehyde that are thermogenic agents which in turn react with the hydrogen peroxide as described. Using thiourea as an illustration of the above reaction, and ignoring the other possible reaction products in equilibrium with a mixture of thiourea and formaldehyde, the exothermic reaction could be shown as:

$H_2NC(S)N(H)CH_2OH + 6H_2O_2 + 2OH^- \rightarrow$
$\qquad H_2NC(O)NH_2 + CO_2 + SO_4^= + 8H_2O$ methylolthiourea    urea Materials having the grouping

that may be used with the present invention are thiourea; acyl thioureas such as acetylthiourea; imidazolidinethiones such as ethylene thiourea and 4,5-dihydroxy-2-imidazolidinethione; thioglycolurils such as

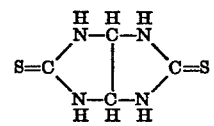

diethylthiourea; thiobarbiturates such as thiobarbital; thiazolidinethiones such as rhodanine; thioamides such as thioacetamide; and dithiocarbamates of primary amines and amides as described above in Equations a through d. Generally, a weight ratio of about one part formaldehyde to about 1–10 parts of a compound containing the above-described

grouping is satisfactory. A particularly preferred mixture is about one part by weight formaldehyde to about 2.0–4.0 parts thiourea.

The efficiency of the thermogenic agents of the present invention was confirmed by simple temperature measurements and by comparison with calculated heat of reaction values when available. For example, when comparing the observed temperature rise with the calculated hypothetical value of the thermogen prepared from thiourea and formaldehyde, it was found that the observed temperature rise was greater than that calculated by adding the heats of reaction of thiourea and the hypothetical value calculated for formaldehyde. In tests in which the same amount of hydrogen peroxide was reacted in an open stirred glass beaker at ambient temperature (about 25° C.) with the indicated amount of thermogen in a solution made up with water to 100 grams, the figures in Table I were obtained. The amount of hydrogen peroxide used in the reactions was 3 grams (100%) basis.

TABLE I

| Thermogen | Amount, gm. | Observed temp. rise, °C. | Calculated temp. rise, °C. |
|---|---|---|---|
| Prior art: | | | |
| Sodium thiosulfate | 3.5 | 55 | 71 |
| Thiourea | 1.78 | 25 | 35.8 |
| Examples of the invention: | | | |
| Thiourea | 1.2 | 66 | 46.8 |
| Formaldehyde (100% basis) | 0.4 | | |
| Xanthates: | | | |
| Urea | 0.65 | 53 | |
| Carbon disulfide | 0.81 | | |
| Urea | 0.65 | 60 | |
| Carbon disulfide | 0.65 | | |
| Formaldehyde | 0.4 | | |
| Triethanolamine | 1.6 | 46 | |
| Carbon disulfide | 0.81 | | |
| Benzyl alcohol | 1.2 | 58 | |
| Carbon disulfide | 0.81 | | |
| Triton X-100* | 2.7 | 44 | |
| Carbon disulfide | 0.81 | | |
| Oleyl alcohol | 2.9 | 47 | |
| Carbon disulfide | 0.81 | | |
| Triisopropanolamine | 2.1 | 35 | |
| Carbon disulfide | 0.81 | | |
| Glycerol | 1.0 | 49 | |
| Carbon disulfide | 0.81 | | |
| Propylene glycol | 0.81 | 48 | |
| Carbon disulfide | 0.81 | | |
| Carbowax | 3.8 | 47 | |
| Carbon disulfide | 0.81 | | |

TABLE I—Continued

| Thermogen | Amount, gm. | Observed temp. rise, °C. | Calculated temp. rise, °C. |
|---|---|---|---|
| Dithiocarbamates: | | | |
| Diethylene triamine | 1.2 | 50 | |
| Carbon disulfide | 0.81 | | |
| Diethylene triamine | 1.2 | 58 | |
| Carbon disulfide | 0.65 | | |
| Formaldehyde | 0.4 | | |
| Morpholine | 1.6 | 60 | |
| Carbon disulfide | 0.81 | | |
| Morpholine | 1.6 | 63 | |
| Carbon disulfide | 0.65 | | |
| Formaldehyde | 0.4 | | |
| Glycine | 0.8 | 56 | |
| Carbon disulfide | 0.81 | | |
| Xylene diamine | 0.73 | 64 | |
| Carbon disulfide | 0.81 | | |
| Acetamide | 0.64 | 55 | |
| Carbon disulfide | 0.81 | | |
| Diethylthiourea | 0.94 | 54 | |
| Carbon disulfide | 0.54 | | |
| Thiourea | 0.54 | 55 | |
| Carbon disulfide | 0.54 | | |
| Monoethanolamine | 1.3 | 55 | |
| Carbon disulfide | 0.81 | | |
| Diethanolamine | 2.3 | 53 | |
| Carbon disulfide | 0.81 | | |

*Rohm & Haas trade name for nonylphenylpolyethoxyethanol.

It is seen that these are very efficient thermogens. The temperature rise for small amounts of reactants being, even in the least efficient one (Triton X–100 and carbon disulfide), 79° on the Fahrenheit scale under the test conditions.

The maximum temperature rise obtainable with the thrmogenic systems of the present invention is substantially the limits of solubility of any of the particular combinations. Therefore, it can be seen that any desired temperature rise can be obtained by pro-rating the quantities of reactants used to the limits of solubility of the reaction products of any particular combination.

In the above-described tests, it was noted that, although no free formaldehyde could be found chemically in compositions containing appropriate proportions of formaldehyde with one of the cited chemical species, upon addition of hydrogen peroxide and rapid rise of temperature to functioning levels, a strong odor of free formaldehyde could be detected.

Since free formaldehyde is undesirable in cosmetic preparations, a bisulfite salt may be utilized to eliminate liberation of free formaldehyde as temperature increases in accordance with the reaction:

$$HC(O)H + AHSO_3 \rightarrow HOCH_2SO_3A$$

where A is potassium, sodium, or an alkanolamine such as diethanolamine or triethanolamine. Generally, the amount of bisulfite is 0.1 to 0.8 mole per mole formaldehyde in the formulation.

The following is an example of utilizing sodium bisulfite as a means for inhibiting free formaldehyde formation.

Example: 1.5 moles thiourea, and 0.5 mole of sodium bisulfite per mole of formaldehyde were reacted with hydrogen peroxide without any evidence of free formaldehyde being liberated. The above mixture reached a temperature 11° C. higher and reacted more rapidly in the presence of 0.1% catalyst than did thiosulfate with 0.5% catalyst (the catalyst being sodium molybdate). The same reductant and oxidant combination without sulfite present gave identical results.

In accordance with specific embodiments of the present invention, it is preferred to use a two-phase system wherein the two phases are mixed immediately before use. One phase contains an oxidant and the other contains a reductant whereby mixing the two evolves enough heat to produce a sensible rise in the temperature of the dispensed mixture. A temperature rise of at least 25° C. above room temperature is generally considered desirable. In the specific examples given hereinbelow, the weight ratio of reductant to oxidant was about 3:1. This effected a temperature rise greater than 45° F. in the dispensed product. It is to be understood, however, that this ratio may be widely varied to produce an effective product and can range from about 10:1 to 1:10 depending on the valve means used, thermogen and oxidant reacted, the reactant concentrations, the temperature rise desired, and the type of product being dispensed.

Any suitable two compartment containers may be employed for purposes of the present invention. Exemplary dispensing containers for use with the invention and which are hereby incorporated by reference are those shown in U.S. Pats. 3,455,489; 2,973,883; and 3,659,755.

When one of the pressure-tight co-dispensing containers of the above-mentioned patents is used, self-pressurization may be employed through use of a compressed or liquefied gas within the container means in either or both of the isolated compositions. In such a case, the containers should be pressure-tight and have sufficient wall strength to withstand the propellant pressures employed. Propellants must be of such a nature that they do not interfere with the effectiveness of the dispensed ingredients and thus must be fully compatible therewith. Such propellants should have pressures or vapor pressures of approximately 12 to 85 lbs. per square inch gage at 70° F. Examples of propellants are saturated hydrocarbons such as propane, butane, isobutane and the like and/or chlorofluoroalkanes containing not more than 2 carbon atoms and at least one fluorine atom having the desired vapor pressure. Propellant gases such as nitrogen, argon, carbon dioxide or nitrous oxide may be used, or liquefied, more highly soluble propellants such as dimethyl ether and vinyl chloride, may also be used as pressurization means.

The thermogenic systems of the present invention can be used with any compatible and conventional consumer-type ingredients. Preferably, the thermogenic system is separated into a two-part system within isolated compartments in a dispensing package. The hydrogen peroxide being in one part and the thermogen (reductant) in the other part. The thermogen part may contain the consumer-type ingredients if compatible. It is to be understood that the particular consumer-type ingredients form no part of the present invention and are a matter of choice depending on the end product desired. With cosmetic preparations involving the formaldehyde system, it is usually necessary to include a sulfite or bisulfite salt to prevent the formation of free formaldehyde which would be irritating to the skin. In preparations for the formation of hot windshield deicers, automobile engine cleaners, hard surface cleaners and the like, the use of sulfite or bisulfite salts would be unnecessary.

As mentioned, the oxidant and reductant compositions are packaged within a container in such a way as to remain isolated from each other. Valve means are provided to communicate with each of the compositions such that upon actuation of the valve means a quantity of each composition is brought together and dispensed from the package. The quantity and concentration of the materials must be adjusted in relation to the proportioning properties of the valve means to attain the desired temperature rise and product effect. This is simply a matter of choice and is dependent on the type of container means being utilized and product being dispensed.

The proportion of oxidants and reductants to the total composition depends upon how much heat is desired, how much heat is required to heat the composition itself, and the rate at which the heat is dissipated. Generally, a much higher temperature rise will be utilized in hot windshield deicing compositions or engine degreasing compositions than shaving cream or cleansing preparations or other personal-use products.

The containers utilized with the present invention may be filled by conventional means wherein self-pressurization may be brought about by the aforementioned compressed and/or liquefied propellant which can be included in either or both compositions. Either pressure or cold filling techniques may be utilized.

Examples of utilizing the thermogenic system of the present invention in various consumer products is shown in the following examples which are intended to be merely illustrative of the invention and not in limitation thereof.

EXAMPLE 1.—HOT SHAVING CREAM

Phase I

| | Parts by weight |
|---|---|
| Stearic acid | 6.23 |
| Coconut oil fatty acids | 1.39 |
| Mineral oil | 1.00 |

Heat to about 70° C. add with stirring to the following also at about 70° C.:

| | |
|---|---|
| Water, about | 65.0 |
| Triethanolamine | 4.454 |
| Coconut fatty acid diethanolamide | 1.2 |
| Diethanolamine | 7.0 |

Cool to about 40° C. add with stirring, in sequence:

| | |
|---|---|
| Sodium molybdate | 0.167 |
| Thiourea | 1.3 |
| Formaldehyde, solution 37% | 1.1 |
| Sodium metabisulfite | 0.71 |
| Perfume | 0.8 |
| Water to make | 100 |

Phase II

| | |
|---|---|
| Hydrogen peroxide, 50% | 25 |
| Purified water, to make | 100 |

Phase I is placed in an aerosol can, pressurized with an appropriate concentration of a hydrocarbon propellant mixture, a fluorocarbon propellant mixture or a combination of the two. A co-dispensing valve, to which is attached a flexible container, is crimped into the can opening. The flexible container is filled with an appropriate amount of Phase II (the valve being designed to meter about 3 parts of Phase I and 1 part of Phase II). On being actuated, the valve dispenses a rich lather which begins warming up as it is dispensed, and rapidly becomes piping hot.

EXAMPLE 2.—HOT CLEANSING CREAM

Phase I

| | Parts by weight |
|---|---|
| Mineral oil | 30.0 |
| Lanolin | 1.0 |
| Cetyl alcohol | 1.0 |
| Arlacel 80 | 2.1 |

Heat to about 70° C. add with stirring to the following also at about 70° C.:

| | |
|---|---|
| Water | 33 |
| Tween 80 | 4.9 |
| Coconut fatty acid diethanolamide | 2.0 |
| Miranol 2 MCA | 20.0 |
| Diethanolamine | 7.0 |

Cool to about 40° C. add with stirring, in sequence:

| | |
|---|---|
| Sodium molybdate | 0.167 |
| Thiourea | 1.3 |
| Formaldehyde, solution 37% | 1.1 |
| Sodium metabisulfite | 0.71 |
| Perfume | 0.8 |
| Water to make | 100 |

Phase II

| | |
|---|---|
| Hydrogen peroxide, 50% | 25 |
| Purified water | 100 |

Phase I is placed in an aerosol can, pressurized with an appropriate concentration of a hydrocarbon propellant mixture, a fluorocarbon propellant mixture or a combination of the two, and a co-dispensing valve, to which is attached a flexible container filled with an appropriate amount of phase II (the valve being designed to meter about 3 parts of phase I and 1 part of phase II) is crimped into the opening of the can. On being actuated, the valve dispenses a rich lather which begins warming up as it is dispensed, and rapidly becomes piping hot, and breaks down to a creamy consistency as it is rubbed over the skin.

EXAMPLE 3.—HOT ANTISEPTIC HAND CLEANER

Phase I

| | Parts by weight |
|---|---|
| Tincture of greensoap | 86.6 |
| Sodium molybdate | 0.19 |
| Diethanolamine | 7.00 |
| Rhodanine | 2.82 |
| Formaldehyde, 37% | 1.09 |
| Sodium metabisulfite | 0.71 |
| Hexachlorophene | 2.00 |
| Perfume | 0.30 |

Phase II

| | |
|---|---|
| Hydrogen peroxide, 50% | 25 |
| Purified water, to make | 100 |

Phase I is placed in an aerosol can, pressurized with an appropriate concentration of a hydrocarbon propellant mixture, a fluorocarbon propellant mixture or a combination of the two, and a co-dispensing valve, to which is attached a flexible container filled with an appropriate amount of phase II (the valve being designed to meter about 3 parts of phase I and 1 part of phase II) is crimped into the opening of the can. On being actuated, the valve dispenses a rich lather which begins warming up as it is dspensed, and rapidly becomes piping hot.

EXAMPLE 4.—HOT HARD SURFACE DISINFECTANT-CLEANER

Phase I

| | Parts by weight |
|---|---|
| Water | 66.0 |
| Diisopropanolamine | 13.4 |
| Carbon disulfide | 1.86 |

Stir or shake in a closed vessel until the reaction is completed; a clear solution results. Add, with stirring, the following mixture:

| | |
|---|---|
| Oleic acid | 1.25 |
| Cresylic acid | 2.0 |

Then add:

| | |
|---|---|
| Linear alkyl sulfate | 15.0 |
| Sodium molybdate | 0.49 |

Phase II

| | |
|---|---|
| Hydrogen peroxide, 50% | 40 |
| Purified water to make | 100 |

When pressurized in a co-dispensing aerosol container designed to deliver a ratio of about three parts of phase I to 1 part of phase II, on actuation of the valve a hot, sanitizing foam is extruded.

Diisopropanolamine is shown as a typical example. The initial step, agitating the carbon disulfide with the aqueous solution of amine causes the carbon disulfide to react with part of the amine to form the dithiocarbamate salt. Any other primary or secondary amine or amide previously described could be substituted on about an equimolar basis, forming the analogous dithiocarbamate, all of which react in the same manner in any of the quoted examples to generate heat.

This is also true of the previously described xanthates which can be made, as indicated below, using carbon disulfide, sodium or potassium hydroxide, and any alcohol or tertiary amino alcohol previously described, in aqueous solution. A typical example, using triethanolamine, follows:

| | Parts by weight |
|---|---|
| Water | 65.0 |
| Triethanolamine | 11.0 |
| Potassium hydroxide, 40% solution | 3.44 |
| Carbon disulfide | 1.86 |

The remainder of Phase I and Phase II are the same as with the dithiocarbamate salts.

EXAMPLE 5.—HOT WINDSHIELD DEICER

Phase I

| | Parts by weight |
|---|---|
| Water | 15.4 |
| Sodium molybdate | 0.10 |
| Thiourea | 3.23 |
| Formaldehyde, 37% | 1.81 |
| Diethanolamine | 10.5 |
| Ethylene glycol | 10.0 |
| Isopropanol | 60.0 |

Mix until a clear solution results.

Phase II

| | |
|---|---|
| Hydrogen peroxide, 50% | 50.0 |
| Purified water | 50.0 |

When sprayed from a co-dispensing aerosol can in the proportion of about 3 parts of phase I to 1 part of phase II, sufficient heat is generated in several seconds to cause the mixture to boil unless it is sprayed in a thin film on a cold surface, such as an automobile windshield coated with ice; in this instance it causes the ice to melt rapidly. When the windshield is then wiped, a film of solvent is left on the glass that delays further ice formation.

EXAMPLE 6.—HOT AUTOMOBILE ENGINE CLEANER

Phase I

| | Parts by weight |
|---|---|
| Water | 10.0 |
| Urea | 0.61 |
| Sodium hydroxide, 40% | 2.2 |
| Carbon disulfide | 1.61 |

Agitate until a clear solution results. Add and dissolve:

| | |
|---|---|
| Diethanolamine | 7.0 |
| Thiourea | 1.61 |
| Formaldehyde | 0.91 |

Separately mix:

| | |
|---|---|
| Oleyl imidazoline | 9.0 |
| Deodorized kerosene | 67.1 |

Add with rapid stirring to the aqueous portion to form a smooth emulsion.

Phase II

| | |
|---|---|
| Hydrogen peroxide, 50% | 50 |
| Purified water | 50 |

When a pressurized co-dispensing aerosol is prepared as described above, a hot foaming composition is extruded which, when sprayed on a grime-and-grease-encrusted automobile engine, will penetrate and make the caked deposite peptizable. A stream of water from a garden hose will then wash away the weakened encrustation.

I claim:

1. A thermogenic system for generating heat consisting essentially of hydrogen peroxide in reaction with a thermogen present in an effective amount sufficient to produce a sensible heat rise and selected from the group consisting of:
    (1) a xanthate defined as ROC(S)SA where R is an alkyl containing 1–18 carbon atoms; or a hydroxyalkyl containing 1–18 carbon atoms; or an alkoxyalkyl exemplified by $R_1(OCHR_2CH_2)_n$ in which $R_1$ is the same as R, $R_2$ is H or an alkyl containing 1–4 carbon atoms, and $n$ is a number from 1 to 20; or a tertiary aminoalkyl exemplified by $(R_4)_2NR_5$ where $R_4$ is an alkyl containing 1–18 carbon atoms or a hydroxyalkyl containing 2–4 carbon atoms and $R_5$ is an alkyl containing 2–18 carbon atoms; or an alkyl phenyl in which the alkyl side chain contains 8 or 9 carbon atoms; and A is selected from the group consisting of Na, K, and a tertiary ammonium of which the formula is $(R_4)_3NH+$;
    (2) a dithiocarbamate selected from the group consisting of:
        (a) $RC(X)N(R_1)C(S)SA$ where X is oxygen or sulfur; R is an alkyl containing 1–17 carbon atoms; $R_1$ is H or an alkyl containing 1–3 carbon atoms or hydroxyalkyl containing 2–4 carbons; and A is selected from the group consisting of Na, K, and a tertiary ammonium of which the formula is $(R_2)_3NH+$ where $R_2$ is an alkyl containing 1–18 carbon atoms or a hydroxyalkyl containing 2–4 carbon atoms;
        (b)

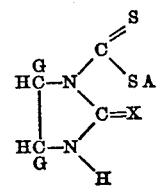

where X is oxygen or sulfur, G is hydrogen or a hydroxyl group, and A is selected from the group consisting of Na, K, and $(R_2)_3NH+$ where $R_2$ is an alkyl containing 1–18 carbon atoms or a hydroxyalkyl containing 2–4 carbon atoms;
        (c) $RN(R_1)C(S)SB$ where R is an alkyl containing 1–18 carbon atoms or a hydroxyalkyl containing 2–4 carbon atoms, or a tertiary aminoalkyl exemplified by $(R_2)_2NR_3$ where $R_2$ is a hydroxyalkyl containing 2–4 carbon atoms or an alkyl containing 1–18 carbon atoms and $R_3$ is an alkyl containing 2–18 carbon atoms; and, where $R_1$ is H or an alkyl containing 1–18 carbon atoms or a hydroxyalkyl containing 2–4 carbon atoms; and, where B is selected from the group consisting of Na, K, a tertiary ammonium of which the formula is $(R)_3NH+$;
        (d) $RN(R_1)C(S)SNH_2RR_1$, where R is an alkyl containing 1–18 carbon atoms; or a hydroxyalkyl containing 2–4 carbon atoms; $R_1$ is H or an alkyl containing 1–18 carbon atoms or a hydroxyalkyl containing 2–4 carbon atoms; and,
    (3) a mixture of formaldehyde and compounds incorporating the grouping

selected from the group consisting of thiourea, acyl thioureas, thioglycolurils, imidazolidinethiones, thiazolidinethiones, thioamides, thiobarbiturates, dithiocarbamates of primary amines and amides.

2. The thermogenic system of claim 1 wherein said thermogen is present in an amount sufficient to produce at least about a 25° C. temperature rise when reacted with said hydrogen peroxide.

3. The thermogenic system of claim 2 wherein said thermogen is an effective amount of a mixture of about one part by weight formaldehyde and about 1–10 parts of a compound selected from the group consisting of thiourea, acetylthiourea, ethylene thiourea, diethylthiourea, thiobarbital, rhodanine, thioacetamide and 4,5-dihydroxy-2-imidazolidinethione.

4. The system of claim 2 wherein said thermogen is a xanthate formed by the reaction between carbon disulfide and a member selected from the group consisting of urea, thiethanolamine, benzyl alcohol, nonylphenylpolyethoxyethanol, oleyl alcohol, triisopropanolamine and glycerol.

5. The system of claim 2 wherein said thermogen is a dithiocarbamate formed by the reaction between carbon disulfide and a member selected from the group consisting of diethylenetriamine, morpholine, glycine, xylene diamine, acetamide, diethylthiourea, thiourea, monoethanolamine and diethanolamine.

6. The system of claim 3 wherein said thermogen is a mixture of about one part by weight formaldehyde and about 2.0–4.0 parts by weight thiourea.

7. A two-part thermogenic system arranged in a dispensing package with consumer-type compositions, the parts to be mixed at the time of dispensing from the package with said consumer-type compositions and in relative amounts sufficient to effect at least about a 25° C. temperature rise in the dispensed mixture; one part consisting essentially of hydrogen peroxide, said other part consisting essentially of a thermogen selected from the group consisting of:

(1) a xanthate defined as ROC(S)SA where R is an alkyl containing 1–18 carbon atoms; or a hydroxyalkyl containing 1–18 carbon atoms; or an alkoxyalkyl exemplified by $R_1(OCHR_2CH_2)_n$ in which $R_1$ is the same as R, $R_2$ is H or an alkyl containing 1–4 carbon atoms; and $n$ is a number from 1 to 20; or a tertiary aminoalkyl exemplified by $(R_4)_2NR_5$ where $R_4$ is an alkyl containing 1–18 carbon atoms or a hydroxyalkyl containing 2–4 carbon atoms and $R_5$ is an alkyl containing 2–18 carbon atoms; or an alkyl phenyl in which the alkyl side chain contains 8 or 9 carbon atoms; and A is selected from the group consisting of Na, K, and a tertiary ammonium of which the formula is $(R_4)_3NH^+$;

(2) a dithiocarbamate selected from the group consisting of:

(a) $RC(X)N(R_1)C(S)SA$ where X is oxygen or sulfur; R is an alkyl containing 1–17 carbon atoms; $R_1$ is H or an alkyl containing 1–3 carbon atoms or hydroxyalkyl containing 2–4 carbons; and A is selected from the group consisting of Na, K, and a tertiary ammonium of which the formula is $(R_2)_3NH^+$ where $R_2$ is an alkyl containing 1–18 carbon atoms or a hydroxyalkyl containing 2–4 carbon atoms;

(b)

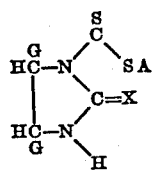

where X is oxygen or sulfur, G is hydrogen or a hydroxyl group, and A is selected from the group consisting of Na, K, and $(R_2)_3NH^+$ where $R_2$ is an alkyl containing 1–18 carbon atoms or a hydroxyalkyl containing 2–4 carbon atoms;

(c) $RN(R_1)C(S)SB$ where R is an alkyl containing 1–18 carbon atoms or a hydroxyalkyl containing 2–4 carbon atoms, or a tertiary aminoalkyl exemplified by $(R_2)_2NR_3$ where $R_2$ is a hydroxyalkyl containing 2–4 carbon atoms or an alkyl containing 1–18 carbon atoms and $R_3$ is an alkyl containing 2–18 carbon atoms; and, where $R_1$ is H or an alkyl containing 1–18 carbon atoms or a hydroxyalkyl containing 2–4 carbon atoms; and, where B is selected from the group consisting of Na, K, a tertiary ammonium of which the formula is $(R)_3NH^+$;

(d) $RN(R_1)C(S)SNH_2RR_1$, where R is an alkyl containing 1–18 carbon atoms; or a hydroxyalkyl containing 2–4 carbon atoms; $R_1$ is H or an alkyl containing 1–18 carbon atoms or a hydroxyalkyl containing 2–4 carbon atoms; and, (3) a mixture of formaldehyde and compounds incorporating the grouping

selected from the group consisting of thiourea, acyl thioureas, thioglycolurils, imidazolidinethiones, thiazolidinethiones, thioamides, thiobarbiturates, dithiocarbamates of primary amines and amides.

8. The system of claim 7 wherein said thermogen is a xanthate formed by the reaction between carbon disulfide and a member selected from the group consisting of urea, triethanolamine, benzyl alcohol, nonylphenylpolyethoxyethanol, oleyl alcohol, triisopropanolamine and glycerol.

9. The system of claim 7 wherein said thermogen is a dithiocarbamate formed by the reaction between carbon disulfide and a member selected from the group consisting of diethylenetriamine, morpholine, glycine, xylene diamine, acetamide, diethylthiourea, thiourea, monoethanolamine and diethanolamine.

10. The system of claim 7 wherein said thermogen is a mixture of about one part by weight formaldehyde and about 1–10 parts compound containing the

grouping.

11. The system of claim 10 wherein said compound containing the

grouping is selected from the group consisting of thiourea, acetylthiourea, ethylene thiourea, diethylthiourea, thiobarbital, rhodanine, thioacetamide and 4,5-dehydroxy-2-imidazolidinethione.

12. The system of claim 10 wherein said thermogen is a mixture of about one part by weight formaldehyde and about 2.0–4.0 parts by weight thiourea.

References Cited
UNITED STATES PATENTS

| | | | |
|---|---|---|---|
| 2,024,923 | 12/1935 | Hirschkind | 260—455 B |
| 2,037,717 | 4/1936 | Graves | 260—455 B |
| 2,976,215 | 3/1961 | Kalopissis et al. | 260—455 B |
| 3,152,993 | 10/1964 | Touey et al. | 252—89 |
| 3,341,418 | 9/1967 | Moses et al. | 252—90 |
| 3,722,752 | 3/1973 | Kenkare et al. | 252—89 |

WILLIAM E. SCHULZ, Primary Examiner

U.S. Cl. X.R.

126—263; 252—90, 102